US011558922B2

(12) United States Patent
Vivanco et al.

(10) Patent No.: US 11,558,922 B2
(45) Date of Patent: Jan. 17, 2023

(54) APPARATUSES AND METHODS FOR MANAGING AND REGULATING TRAFFIC IN NETWORKS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US); Slawomir Mikolaj Stawiarski, Carpentersville, IL (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 62 days.

(21) Appl. No.: 17/320,298

(22) Filed: May 14, 2021

(65) Prior Publication Data
US 2022/0369419 A1 Nov. 17, 2022

(51) Int. Cl.
*H04W 76/34* (2018.01)
*H04W 76/19* (2018.01)
*H04W 24/10* (2009.01)
*H04W 76/15* (2018.01)

(52) U.S. Cl.
CPC .......... *H04W 76/34* (2018.02); *H04W 24/10* (2013.01); *H04W 76/15* (2018.02); *H04W 76/19* (2018.02)

(58) Field of Classification Search
CPC ..... H04W 76/34; H04W 76/19; H04W 76/15; H04W 24/10; H04W 76/36; H04W 36/0033; H04W 69/14; H04W 52/365
See application file for complete search history.

(56) References Cited

U.S. PATENT DOCUMENTS

| 8,681,724 | B2 | 3/2014 | Du et al. |
| 2017/0223699 | A1 | 8/2017 | Yasukawa et al. |
| 2017/0339744 | A1 | 11/2017 | Latheef et al. |

(Continued)

FOREIGN PATENT DOCUMENTS

WO  WO-2016190789 A1 * 12/2016

OTHER PUBLICATIONS

Atanasov, Ivaylo et al., "Programmability of Multi-Connectivity in 5G", IEEE, 2022, 8 pages.

(Continued)

*Primary Examiner* — Mewale A Ambaye
(74) *Attorney, Agent, or Firm* — Guntin & Gust, PLC; Mark Wilinski

(57) ABSTRACT

Aspects of the subject disclosure may include, for example, establishing a first connection with a first network via a first link, establishing a second connection with a second network via a second link subsequent to the establishing of the first connection, obtaining a first threshold value associated with a quality of the second link, measuring a value for a parameter associated with the second link, resulting in a measured value, comparing the measured value to the first threshold value, determining, based on the comparing, that the measured value is less than the first threshold value, and transmitting, based on the determining, a message that signifies that the measured value is less than the first threshold value. Other embodiments are disclosed.

20 Claims, 7 Drawing Sheets

(56) References Cited

U.S. PATENT DOCUMENTS

| | | | |
|---|---|---|---|
| 2018/0049214 A1* | 2/2018 | Kubota | H04W 36/04 |
| 2018/0279376 A1* | 9/2018 | Dinan | H04W 74/0833 |
| 2019/0319833 A1* | 10/2019 | Nagaraja | H04W 72/085 |
| 2019/0357292 A1* | 11/2019 | Cirik | H04W 24/08 |
| 2020/0146063 A1* | 5/2020 | Xu | H04W 24/08 |
| 2021/0051634 A1 | 2/2021 | Fakoorian et al. | |
| 2022/0132612 A1 | 4/2022 | Chang et al. | |

OTHER PUBLICATIONS

Centenaro, Marco et al., "Resource-Efficient Dual Connectivity for Ultra-Reliable Low-Latency Communication", IEEE, 2022, 5 pages.
Yilmaz, Osman N. et al., "Overview of LTE-NR Dual Connectivity", IEEE, 2019, 7 pages.

* cited by examiner

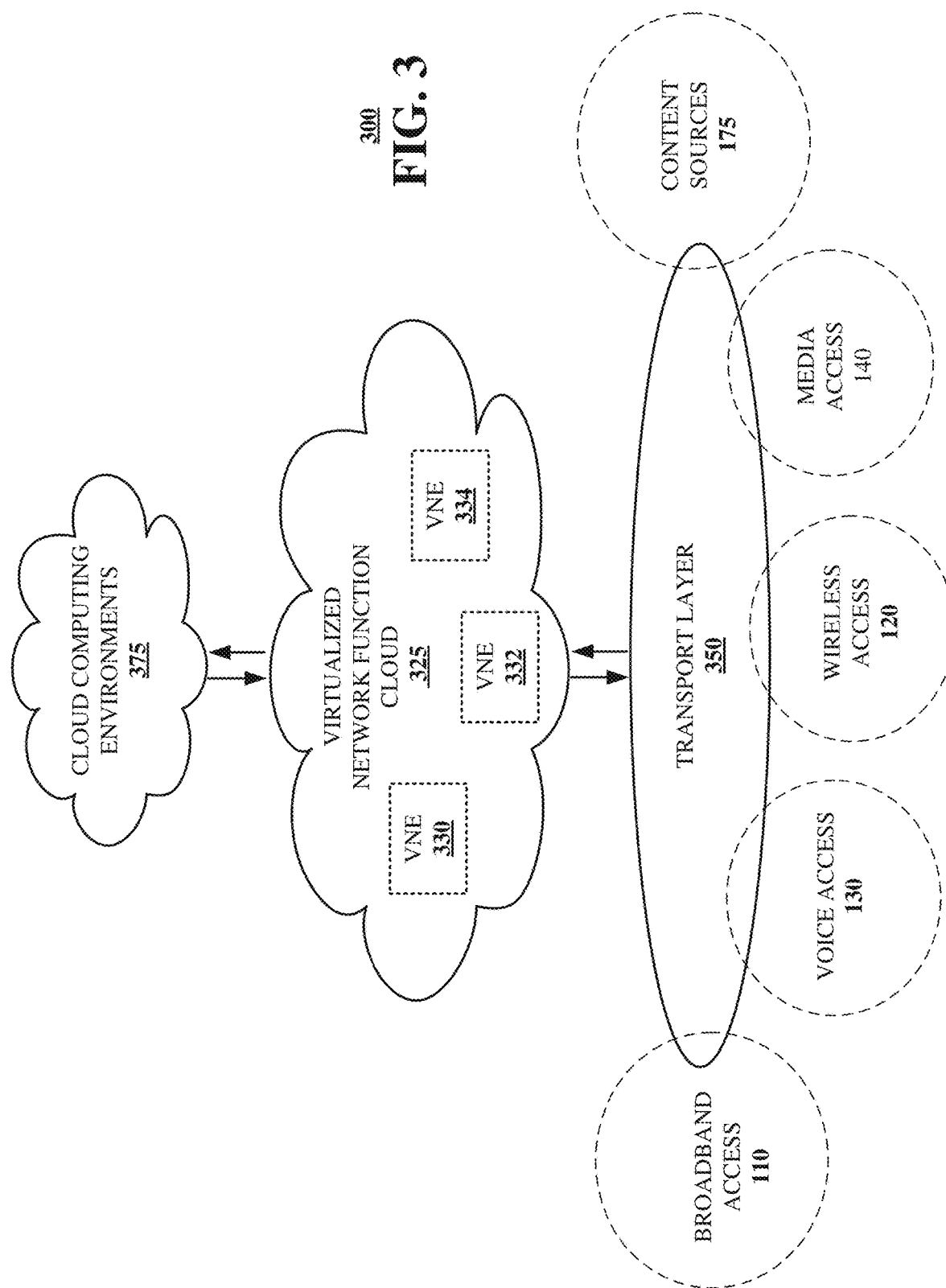

APPARATUSES AND METHODS FOR MANAGING AND REGULATING TRAFFIC IN NETWORKS

FIELD OF THE DISCLOSURE

The subject disclosure relates to apparatuses and methods for managing and regulating traffic in networks.

BACKGROUND

As the world increasingly becomes connected via vast communication networks and via various communication devices, additional opportunities are created/generated to provision data to such devices. A communication device may be able to connect to two networks at once (hereinafter referred to as a state or condition of dual connectivity). The use of dual connectivity may enhance the amount of data that may be provided from, e.g., network infrastructure to the communication device over time (e.g., may enhance the effective throughput), which can facilitate an execution of high-quality, data-rich applications (e.g., streaming video) at the communication device.

Due to various factors/conditions (such as, for example: mobility of a communication device, limited signal transmission power, interference, noise, etc.), the quality of a communication link associated with a given network connection may be subject to degradation. In some instances, a given communication link may be at least temporarily lost/released/discarded. In such a scenario, data that might have otherwise been conveyed to the communication device via the given link may be conveyed to the communication device via another link. Thereafter, it is possible that the factors/conditions may change, such that the communication device may reestablish the given link; data transfer over the given link may then be restored.

As the foregoing example demonstrates, the communication device may experience oscillations or bursts in terms of whether the communication device is engaged in dual connectivity (e.g., whether multiple links are available to transfer data). Such oscillations may result in (rapid) fluctuations in terms of the provisioning of data to the communication device, which may imply high delay fluctuations and jitter, which in turn can deteriorate the quality of service (QoS) and the quality of experience (QoE).

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for managing and regulating distributions of traffic amongst networks and network connections via the use of one or more thresholds. Other embodiments are described in the subject disclosure.

One or more aspects of the subject disclosure include, in whole or in part, obtaining a quality of service (QoS) requirement in respect of a communication service that is provisioned to a user equipment via a dual connectivity with the user equipment, wherein the dual connectivity includes a first connection to a first network operative in accordance with a first radio access technology (RAT) and a second connection to a second network operative in accordance with a second RAT that is different from the first RAT, identifying an application that is executed by the user equipment as part of the communication service, resulting in an identified application, selecting a first threshold value for the second connection based on the QoS requirement and the identified application, providing, based on the selecting, the first threshold value to the user equipment, obtaining a report from the user equipment, wherein the user equipment sends the report based on a measured value associated with the second connection being less than the first threshold value, and causing an action to be performed based on the obtaining of the report.

One or more aspects of the subject disclosure include, in whole or in part, establishing a first connection with a first network via a first link, establishing a second connection with a second network via a second link subsequent to the establishing of the first connection, obtaining a first threshold value associated with a quality of the second link, measuring a value for a parameter associated with the second link, resulting in a measured value, comparing the measured value to the first threshold value, determining, based on the comparing, that the measured value is less than the first threshold value, and transmitting, based on the determining, a message that signifies that the measured value is less than the first threshold value.

One or more aspects of the subject disclosure include, in whole or in part, establishing a first connection with a communication device, wherein the first connection is associated with a first network, and wherein the communication device is connected to a second network via a second connection prior to the establishing of the first connection, determining that a quality of the first connection is less than a first threshold value, wherein the first threshold value is different from a second threshold value, and wherein the second threshold value corresponds to a loss of the first connection between a processing system and the communication device, causing, based on the determining, at least one action to be performed, and subsequent to the at least one action being performed, authorizing a release of the first connection.

Figure 1:
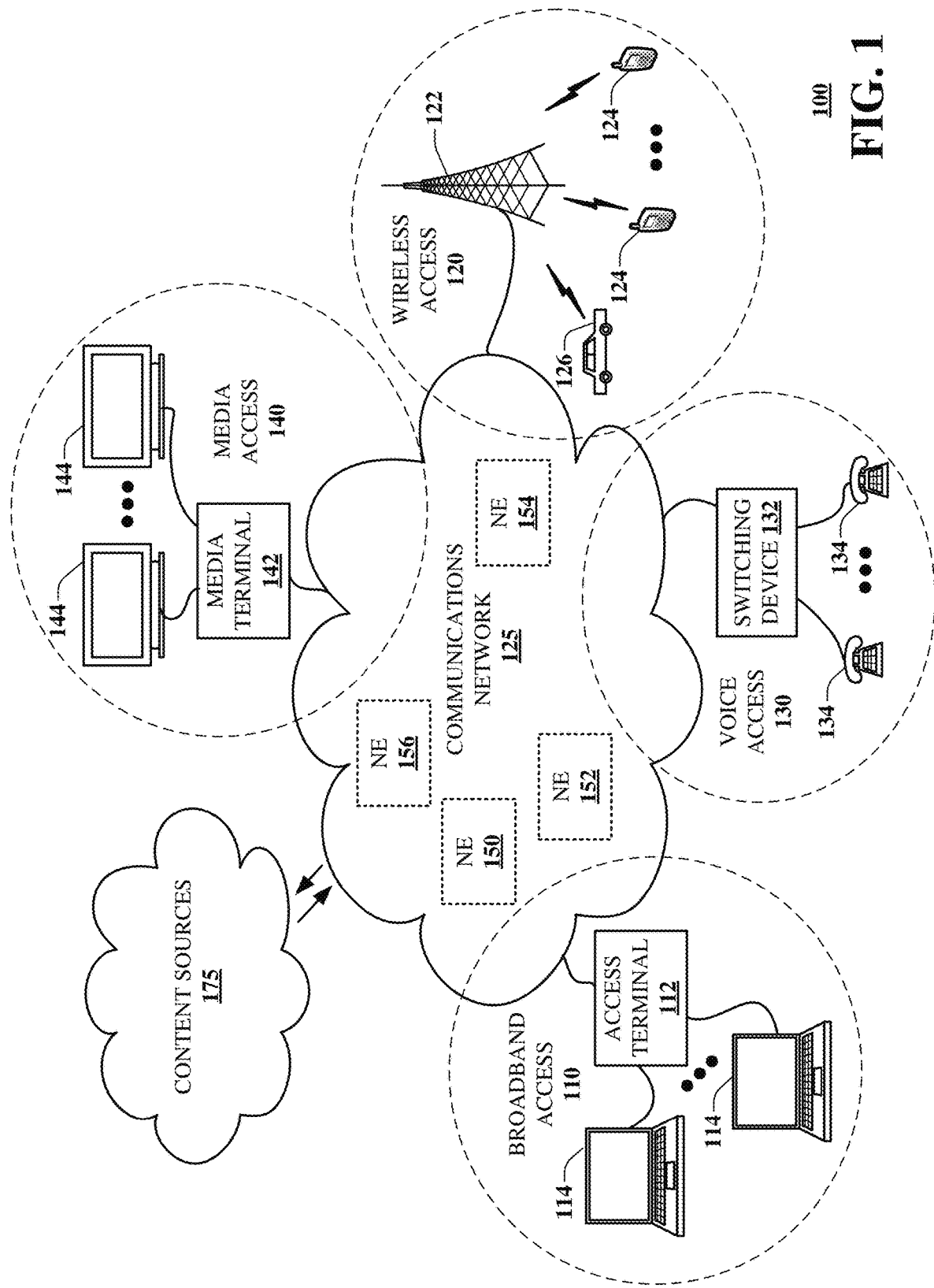
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part obtaining a quality of service (QoS) requirement in respect of a communication service that is provisioned to a user equipment via a dual connectivity with the user equipment, wherein the dual connectivity includes a first connection to a first network operative in accordance with a first radio access technology (RAT) and a second connection to a second network operative in accordance with a second RAT that is different from the first RAT, identifying an application that is executed by the user equipment as part of the communication service, resulting in an identified application, selecting a first threshold value for the second connection based on the QoS requirement and the identified application, providing, based on the selecting, the first threshold value to the user equipment, obtaining a report from the user equipment, wherein the user equipment sends the report based on a measured value associated with the second connection being less than the first threshold value, and causing an action to be performed based on the obtaining of the report. System 100 can facilitate in whole or in part establishing a first connection with a first network via a first link, establishing a second connection with a second network via a second link subsequent to the establishing of the first connection, obtaining a first threshold value associated with a quality of the second link, measuring a value for a parameter associated with the second link, resulting in a measured value, comparing the measured value to the first threshold value, determining, based on the comparing, that the measured value is less than the first threshold value, and transmitting, based on the determining, a message that signifies that the measured value is less than the first threshold value. System 100 can facilitate in whole or in part establishing a first connection with a communication device, wherein the first connection is associated with a first network, and wherein the communication device is connected to a second network via a second connection prior to the establishing of the first connection, determining that a quality of the first connection is less than a first threshold value, wherein the first threshold value is different from a second threshold value, and wherein the second threshold value corresponds to a loss of the first connection between a processing system and the communication device, causing, based on the determining, at least one action to be performed, and subsequent to the at least one action being performed, authorizing a release of the first connection.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
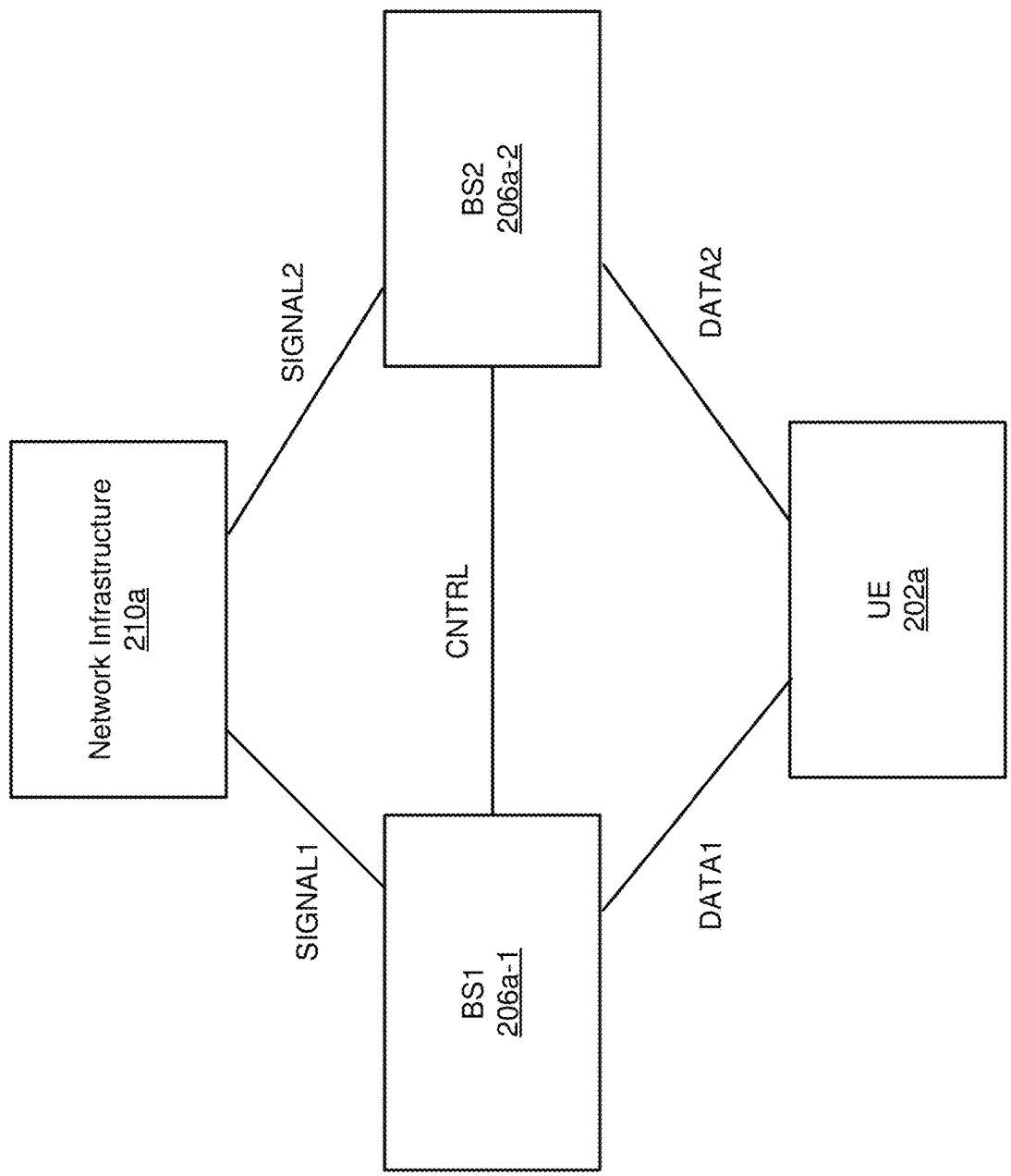
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a in accordance with aspects of this disclosure. In some embodiments, the system 200a may function within, or may be operatively overlaid upon, the communication network 100 of FIG. 1.

The system 200a may support dual connectivity with respect to a communication device, such as a user equipment (UE) 202a. In particular, the UE 202a may be simultaneously connected to a first network and a second network. The first network may be operative in accordance with a first radio access technology (RAT) and the second network may be operative in accordance with a second RAT. The second RAT may be different from the first RAT. In an illustrative embodiment, the first RAT may correspond to an LTE or 4G network technology, and the second RAT may correspond to a 5G network technology.

Continuing the above example, the first network/RAT may be associated with, or include, a first base station (BS) 206a-1 and the second network/RAT may be associated with, or include, a second BS 206a-2. The use of the base stations BS1 206a-1 and BS2 206a-2 in FIG. 2A is illustrative. More generally, communication devices may be used in addition to the base stations and/or in place of the base stations.

In some embodiments, the base stations BS1 206a-1 and BS2 206a-2 may include, be associated with, or may be at least partially replaced by one or more radio intelligent controllers (RICs), mobile edge computing (MEC) devices, self-organized network (SON) elements, or the like. Stated slightly differently, functionality associated with the base stations may be distributed amongst other devices (not shown in FIG. 2A), potentially inclusive of other devices that may be located proximal to an edge or boundary of a given network. As one skilled in the art would appreciate, relocating such functionality proximal to the edge of a network may reduce the latency experienced by the UE 202a in terms of, e.g., a transfer of data involving the UE 202a, decision-making processes involving the UE 202a, etc., which may enhance the QoS and/or QoE involving the UE 202a.

As set forth above, the use of dual connectivity may enhance the amount of data that may be transferred from/to the UE 202a relative to a state/condition where a single network connection is used. In this respect, the UE 202a is shown as potentially being connected to: the BS1 206a-1 via a first link (denoted as DATA1 in FIG. 2A) and the BS2 206a-2 via a second link (denoted as DATA2 in FIG. 2A). In some embodiments, the links DATA1 and DATA2 may effectively be an extension of user plane or signaling functionality between network infrastructure 210a and the base stations BS1 206a-1 and BS2 206a-2 (denoted as SIGNAL1 and SIGNAL2, respectively, in FIG. 2A).

In some embodiments, the system 200a may support/enable a master-slave configuration, whereby the first BS1 206a-1 may serve as a master/primary and the second BS2 206a-2 may serve as a slave/secondary. Control of dual connectivity may be resident in the primary. For example, in operation the UE 202a may initially connect to network/communication services via the primary. If the UE 202a supports dual connectivity on a frequency band that a secondary supports, the primary may instruct the UE 202a to make measurements on one or more channels/links (e.g., DATA2 in FIG. 2A) associated with one or more secondaries. Assuming that the UE 202a finds/locates a candidate secondary based on such measurements, the primary may communicate to the (candidate) secondary (such as, for example, via the control [CNTRL] interface between the base stations BS1 206a-1 and BS2 206a-2 shown in FIG. 2A) any parameters that may be needed to establish a connection between the secondary and the UE 202a. Once the secondary confirms the establishment of the connection with the UE 202a, the primary may forward a part/portion of the data destined for the UE 202a to the secondary for transmission by the secondary to the UE 202a. Optionally, the primary can then request that the network infrastructure 210a (which may include one or more gateways, authentication servers, billing servers, and the like) to directly exchange user data with the secondary. More generally, in relation to a split of data across the two networks/RATs, the split may occur at the network infrastructure 210a, at the primary/BS1 206a-1, and/or at the secondary/BS2 206a-2. The split of data may occur in respect of a downlink direction, an uplink direction, or both downlink and uplink directions.

In terms of establishing dual connectivity, different types/variants may be used. For example:

in a first variant (referred to herein as "blind addition"), the primary may have defined a default secondary. A UE (e.g., the UE 202a) connected to the primary may attempt to attach to the defined/default secondary. If the UE is not located within the coverage of the secondary, dual connectivity might not be started/initiated and services may continue via the primary (only). On the other hand, if the UE is located within the coverage of the secondary, the UE may establish connectivity with the secondary and services may be rendered via the primary and the secondary.

in a second variant (referred to herein as "coverage based"), the primary may configure a UE to perform measurements. If, based on the performance of such measurements, the UE finds/locates one or more secondaries with a sufficient signal level (e.g., a signal level above a threshold), the UE may send a measurement report to the primary. The primary may then attempt to establish/invoke dual connectivity involving a secondary included in the one or more secondaries, such as for example a secondary included within the one or more secondaries with the strongest signal/signal level.

in a third variant (referred to herein as "data buffer based activation"), the primary may monitor a data volume/load relative to a capacity of the primary. If the data volume/load exceeds a threshold, the primary may attempt to establish/invoke dual connectivity involving a secondary to alleviate some of the load of the primary (e.g., to avoid exceeding, or approaching within a threshold amount, the capacity of the primary).

In some embodiments, aspects of the variants set forth above may be combined with one another. For example, as part of the third variant, the primary may determine that the load/data volume within the primary exceeds a threshold and a secondary is available with a sufficient signal strength (similar to the second variant described above) before attempting to establish/invoke dual connectivity; doing so would help to ensure that a UE does not connect to a secondary with poor signal quality.

Assuming a state/condition where dual connectivity is established, the system 200a may monitor the links (e.g., the secondary link DATA2) to ensure that the links have sufficient quality for serving a given UE (e.g., the UE 202a). If a quality of a given link is insufficient (e.g., a quality of the given link is less than a threshold), the link may be released. Alternatively, or additionally, a link may be released if the link is not being utilized by the UE (or is being utilized in an amount that is less than a threshold). In this respect, a determination may be made whether the link is being used to transfer data, potentially as a function of time, in an amount that is greater than a threshold; if not (e.g., if the amount of data traversing the link is less than the threshold, potentially as a function of time), the link may be released. In some instances, a release of a link may be due to a failure condition, which is to say that a release of a link might not be intended/intentional.

It is noted that the respective qualities of various links/interfaces (such as for example DATA1 and DATA2 shown in FIG. 2A) may, in general, be independent from one another. The divergence/difference in qualities may be due to a number of factors, such as for example: the locations of the base stations BS1 206a-1 and BS2 206a-2, different propagation conditions for operating bands of the networks/ RATs, different output transmitter/transmission power levels, utilization of different frequencies or frequency bands, different modulation/demodulation schemes, etc.

A quality of a given link may be quantified based on (value(s) for) one or more parameters. Such parameters may include, for example: a received signal strength indicator (RSSI), a reference signal received power (RSRP), a reference signal received quality (RSRQ), etc. In some embodiments, the parameters may be combined, such as for example in relation to a ratio of RSRP to RSRQ. Values for, or indicators of, the parameters may be conveyed by the UE $202a$ to, e.g., the BS1 $206a$-1 and/or the BS2 $206a$-2, via one or more messages, reports, or the like.

Figure 2B:
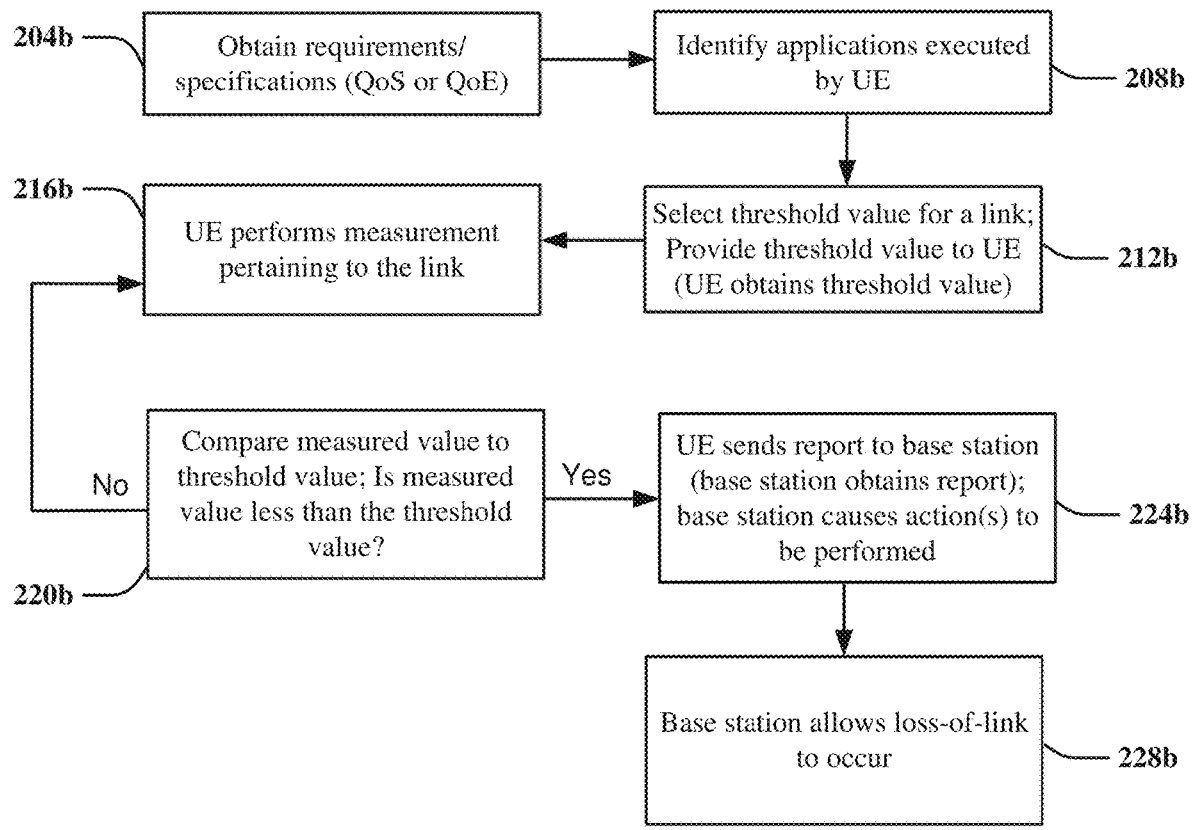
FIG. 2B depicts an illustrative embodiment of a method in accordance with various aspects described herein.

Referring now to FIG. 2B, an illustrative embodiment of a method $200b$ in accordance with various aspects described herein is shown. The method $200b$ may be facilitated, in whole or in part, by one or more systems, devices, and/or components, such as for example the systems, devices, and components set forth herein. The method $200b$ may be executed to manage/regulate traffic in one or more communication systems or networks, as set forth in further detail below in relation to the blocks/operations of the method $200b$.

In block $204b$, one or more specifications or requirements may be obtained. For example, the specifications or requirements may indicate a QoS or QoE that is owed or due to a UE.

In block $208b$, one or more applications executed by the UE may be identified. For example, as part of block $208b$ a determination may be made that the UE is running/executing voice, video, web-browsing and peer-to-peer (P2P) applications.

In block $212b$, a selection may be made for (value(s) of) one or more thresholds that may be utilized by the UE. For example, and in relation to the above description, a threshold of block $212b$ may pertain to an RSRP value that is to be used by the UE in relation to a link (such as for example the link DATA2 shown in FIG. 2A) associated with a given network/RAT. The selection of block $212b$ may be based on the specifications/requirements of block $204b$ and/or the identification of the application(s) of block $208b$.

The selection of block $212b$ may be such that a sufficient headroom/difference is established between a first value for the threshold and a second value corresponding to loss-of-link condition. To demonstrate, if the first value for the threshold is set equal to negative 108 dbm (−108 dbm) and a loss-of-link actually occurs at −110 dbm, the difference of 2 dbm may be too small to provide any advance warning that a loss-of-link is likely to occur. Conversely, if the first value for the threshold is set equal to −90 dbm, and again assuming that a loss-of-link actually occurs at −110 dbm, the difference of 20 dbm may provide sufficient advance warning to take one or more actions, such as for example the actions described below.

As part of block $212b$, the (value(s) of the) one or more thresholds, as selected, may be provided to the UE (potentially in conjunction with one or more messages, configuration files, or the like). The UE may obtain the (value(s) of the) one or more thresholds as part of block $212b$.

In block $216b$, the UE may perform one or more measurements. For example, the UE may perform a RSRP-based measurement of conditions associated with the link.

In block $220b$, the UE may compare the measurement(s) of block $216b$ to the threshold(s) of block $212b$. If, based on the comparison, the measurement(s) (or, analogously, the measured values) are less than the threshold(s) (or, analogously, the threshold values), flow may proceed from block $220b$ to block $224b$; otherwise, flow may proceed from block $220b$ to $216b$.

As one skilled in the art would appreciate, the flow from block $220b$ to block $216b$ may establish a loop, whereby the UE may continue to monitor the conditions of the link relative to the thresholds established as part of block $212b$. In some embodiments, the flow may instead proceed from block $220b$ to block $212b$, such as for example in relation to a reconfiguring of the UE with different threshold values.

In block $224b$, the UE may send a report, message, or the like to, e.g., a base station (see, e.g., FIG. 2A: BS1 $206a$-1, BS2 $206a$-2) advising that a measured value is less than a threshold value. In some embodiments, the report/message may include the measured value, the threshold value, or a combination thereof.

Based on obtaining the report/message of block $224b$, the base station may cause one or more actions to be taken/performed, with a goal/aim of such actions being to reduce (e.g., avoid) abrupt traffic variations. For example, as part of block $224b$ the actions may include one or more of:

applying smoothing or throttling techniques in respect of some or all of the traffic associated with the UE. As an example, P2P traffic may be throttled/reduced to free up resources;

reducing a quality of an audio (e.g., voice) encoding or a video encoding (e.g., changing from high-definition video to low-definition video) to align with a potential loss-of link condition; and increasing a precedence or priority of the UE on another network (such as for example a network associated with the link DATA1 in FIG. 2A) and/or guaranteeing extra resources to the UE on the another network, to align with the potential loss-of-link condition.

In block $228b$, the loss-of-link in respect of the link in question (e.g., the link DATA2 in FIG. 2A) may be allowed to occur. For example, as part of block $228b$, the base station (BS2 $206a$-2 in FIG. 2A) accommodating/support the link may be authorized, or may provide authorization, to release/discard/destroy/terminate the link.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As set forth herein, aspects of this disclosure may monitor conditions associated with a link (or, analogously, a network connection) to determine/identify when it is likely that a loss-of-link condition may transpire. One or more thresholds may be selected and utilized to ensure that sufficient warning/notice of a potential loss-of-link condition is obtained. When such a loss-of-link condition is probable (e.g., when such a loss-of link condition is likely to transpire/occur in an amount that is greater than a threshold), one or more actions may be taken, in advance of the actual loss-of-link, to mitigate the impact of the loss-of-link. In this manner, QoS and QoE in respect of a UE (or associated user) may be ensured and oscillations or data/traffic bursts (in respect of a UE, base stations, network infrastructure, etc.) may be reduced or even completely avoided.

As set forth herein, aspects of this disclosure may be used to manage and regulate traffic/data conveyed by/within one or more networks. For example, aspects of this disclosure may be used to distribute or share load associated with a communication service based on qualities of links or connections associated with one or more networks. Comparisons with one or more thresholds may be conducted/performed as part of decision-making processes or logic in terms of such load/traffic/data management operations.

In some embodiments, (values of/for) one or more thresholds may be determined in accordance with, or based on, an occurrence of one or more events or conditions. For example, the threshold(s) may be based on one or more of: actual network conditions, predicted network conditions, service type, etc. In some embodiments, the thresholds may be (dynamically) selected, determined, identified, and/or updated/modified by one or more communications devices, such as for example a user equipment, a network server, a switch, a router, a gateway, a modem, a base station, etc.

Aspects of this disclosure may be used to convey data between communication devices in respect of one or more environments or applications. Such environments/applications may include, without limitation: media distribution applications, media presentation applications, facilitation of communication sessions (e.g., voice, videoconferencing, etc.), advertising, cross-reality (e.g., virtual reality), etc.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, and method 200b presented in FIGS. 1, 2A, and 2B. For example, a virtualized communication network 300 can facilitate in whole or in part obtaining a quality of service (QoS) requirement in respect of a communication service that is provisioned to a user equipment via a dual connectivity with the user equipment, wherein the dual connectivity includes a first connection to a first network operative in accordance with a first radio access technology (RAT) and a second connection to a second network operative in accordance with a second RAT that is different from the first RAT, identifying an application that is executed by the user equipment as part of the communication service, resulting in an identified application, selecting a first threshold value for the second connection based on the QoS requirement and the identified application, providing, based on the selecting, the first threshold value to the user equipment, obtaining a report from the user equipment, wherein the user equipment sends the report based on a measured value associated with the second connection being less than the first threshold value, and causing an action to be performed based on the obtaining of the report. Virtualized communication network 300 can facilitate in whole or in part establishing a first connection with a first network via a first link, establishing a second connection with a second network via a second link subsequent to the establishing of the first connection, obtaining a first threshold value associated with a quality of the second link, measuring a value for a parameter associated with the second link, resulting in a measured value, comparing the measured value to the first threshold value, determining, based on the comparing, that the measured value is less than the first threshold value, and transmitting, based on the determining, a message that signifies that the measured value is less than the first threshold value. Virtualized communication network 300 can facilitate in whole or in part establishing a first connection with a communication device, wherein the first connection is associated with a first network, and wherein the communication device is connected to a second network via a second connection prior to the establishing of the first connection, determining that a quality of the first connection is less than a first threshold value, wherein the first threshold value is different from a second threshold value, and wherein the second threshold value corresponds to a loss of the first connection between a processing system and the communication device, causing, based on the determining, at least one action to be performed, and subsequent to the at least one action being performed, authorizing a release of the first connection.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
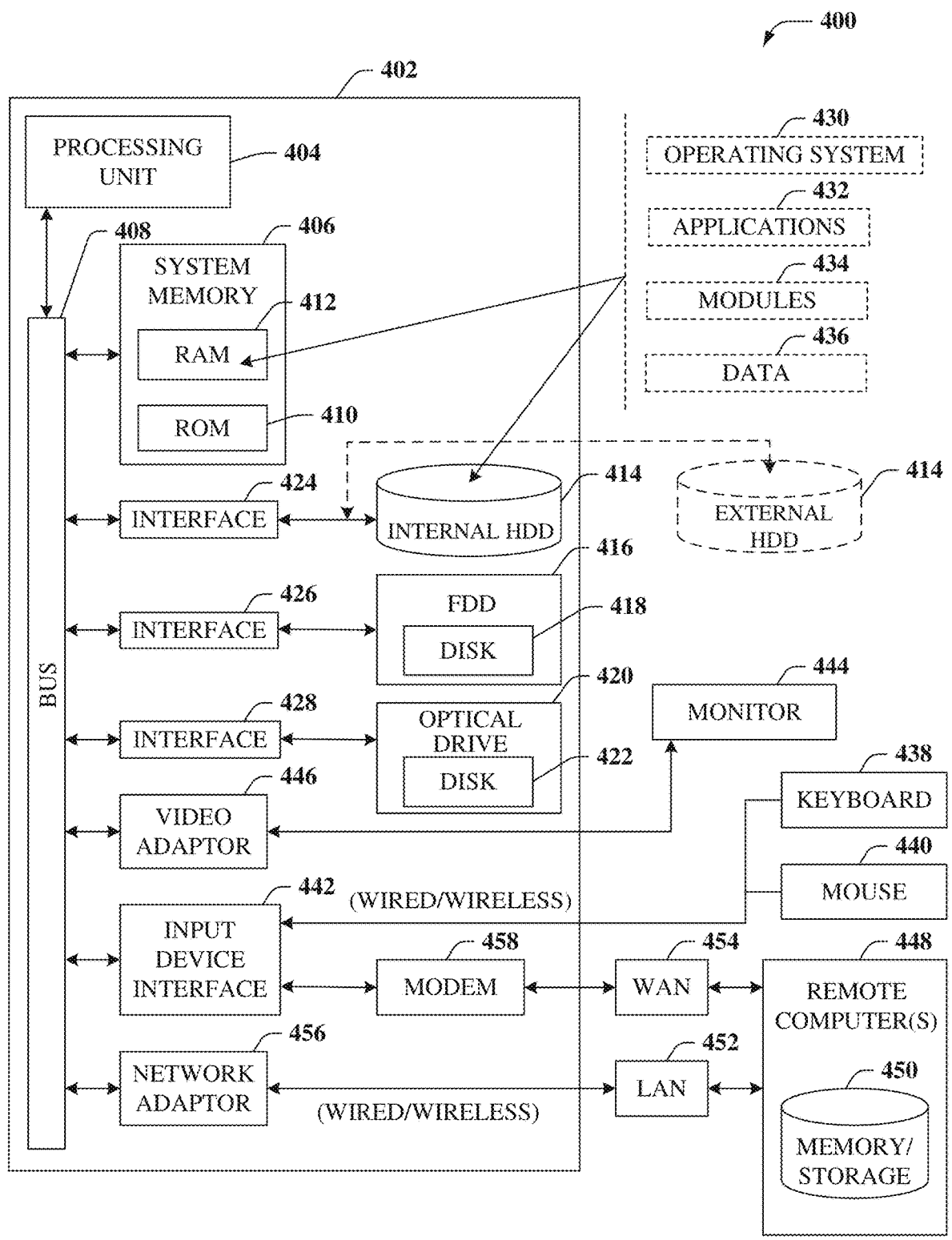
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a quality of service (QoS) requirement in respect of a communication service that is provisioned to a user equipment via a dual connectivity with the user equipment, wherein the dual connectivity includes a first connection to a first network operative in accordance with a first radio access technology (RAT) and a second connection to a second network operative in accordance with a second RAT that is different from the first RAT, identifying an application that is executed by the user equipment as part of the communication service, resulting in an identified application, selecting a first threshold value for the second connection based on the QoS requirement and the identified application, providing, based on the selecting, the first threshold value to the user equipment, obtaining a report from the user equipment, wherein the user equipment sends the report based on a measured value associated with the second connection being less than the first threshold value, and causing an action to be performed based on the obtaining of the report. Computing environment 400 can facilitate in whole or in part establishing a first connection with a first network via a first link, establishing a second connection with a second network via a second link subsequent to the establishing of the first connection, obtaining a first threshold value associated with a quality of the second link, measuring a value for a parameter associated with the second link, resulting in a measured value, comparing the measured value to the first threshold value, determining, based on the comparing, that the measured value is less than the first threshold value, and transmitting, based on the determining, a message that signifies that the measured value is less than the first threshold value. Computing environment 400 can facilitate in whole or in part establishing a first connection with a communication device, wherein the first connection is associated with a first network, and wherein the communication device is connected to a second network via a second connection prior to the establishing of the first connection, determining that a quality of the first connection is less than a first threshold value, wherein the first threshold value is different from a second threshold value, and wherein the second threshold value corresponds to a loss of the first connection between a processing system and the communication device, causing, based on the determining, at least one action to be performed, and subsequent to the at least one action being performed, authorizing a release of the first connection.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
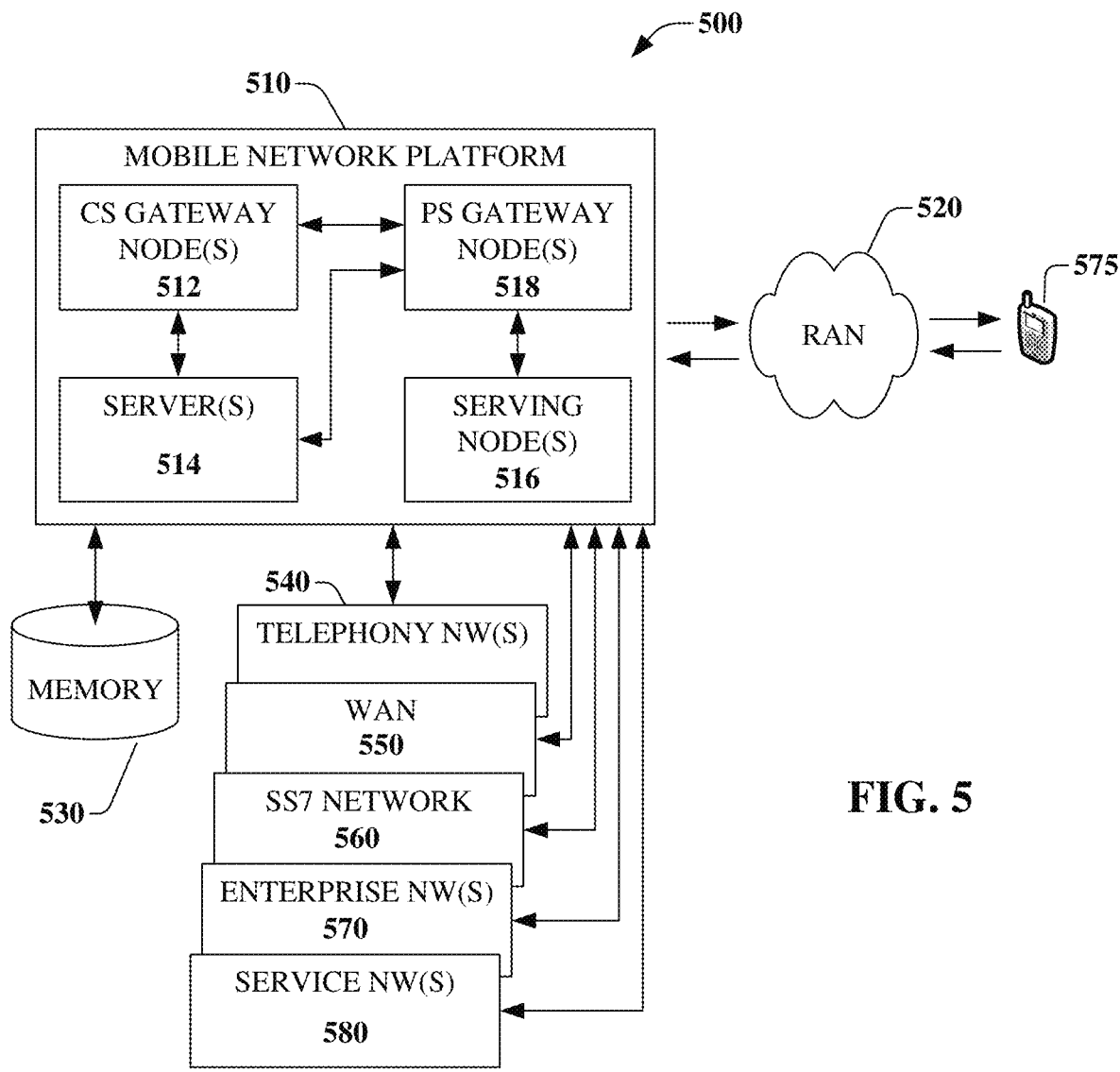
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a quality of service (QoS) requirement in respect of a communication service that is provisioned to a user equipment via a dual connectivity with the user equipment, wherein the dual connectivity includes a first connection to a first network operative in accordance with a first radio access technology (RAT) and a second connection to a second network operative in accordance with a second RAT that is different from the first RAT, identifying an application that is executed by the user equipment as part of the communication service, resulting in an identified application, selecting a first threshold value for the second connection based on the QoS requirement and the identified application, providing, based on the selecting, the first threshold value to the user equipment, obtaining a report from the user equipment, wherein the user equipment sends the report based on a measured value associated with the second connection being less than the first threshold value, and causing an action to be performed based on the obtaining of the report. Platform 510 can facilitate in whole or in part establishing a first connection with a first network via a first link, establishing a second connection with a second network via a second link subsequent to the establishing of the first connection, obtaining a first threshold value associated with a quality of the second link, measuring a value for a parameter associated with the second link, resulting in a measured value, comparing the measured value to the first threshold value, determining, based on the comparing, that the measured value is less than the first threshold value, and transmitting, based on the determining, a message that signifies that the measured value is less than the first threshold value. Platform 510 can facilitate in whole or in part establishing a first connection with a communication device, wherein the first connection is associated with a first network, and wherein the communication device is connected to a second network via a second connection prior to the establishing of the first connection, determining that a quality of the first connection is less than a first threshold value, wherein the first threshold value is different from a second threshold value, and wherein the second threshold value corresponds to a loss of the first connection between a processing system and the communication device, causing, based on the determining, at least one action to be performed, and subsequent to the at least one action being performed, authorizing a release of the first connection.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flatrate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
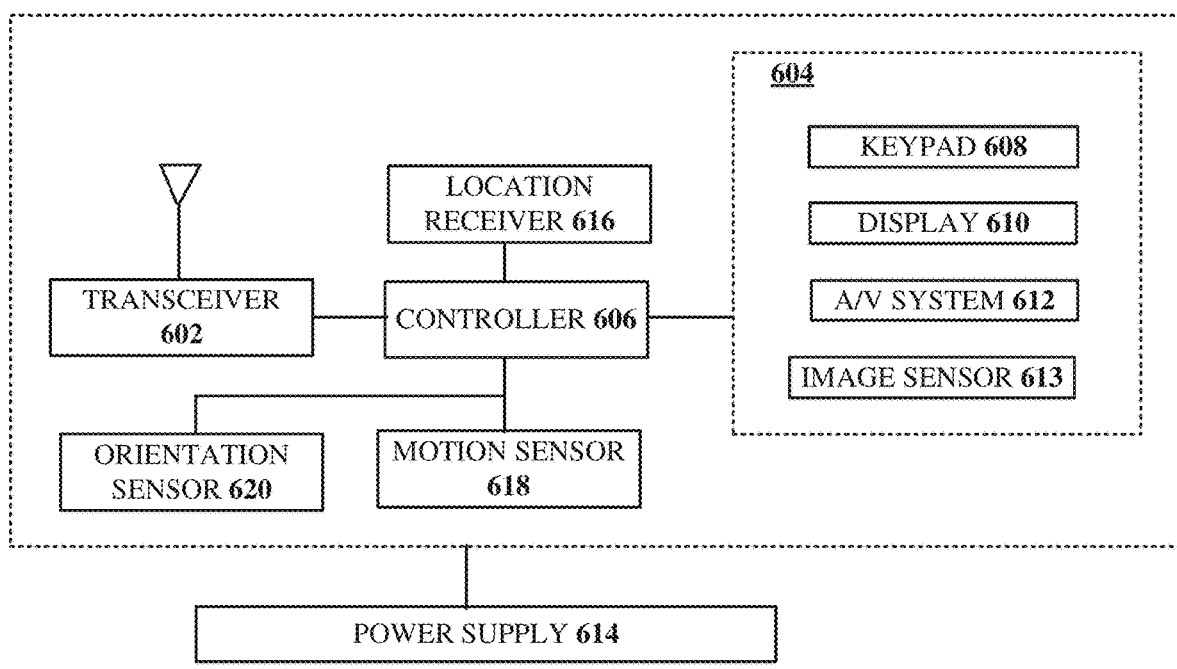
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a quality of service (QoS) requirement in respect of a communication service that is provisioned to a user equipment via a dual connectivity with the user equipment, wherein the dual connectivity includes a first connection to a first network operative in accordance with a first radio access technology (RAT) and a second connection to a second network operative in accordance with a second RAT that is different from the first RAT, identifying an application that is executed by the user equipment as part of the communication service, resulting in an identified application, selecting a first threshold value for the second connection based on the QoS requirement and the identified application, providing, based on the selecting, the first threshold value to the user equipment, obtaining a report from the user equipment, wherein the user equipment sends the report based on a measured value associated with the second connection being less than the first threshold value, and causing an action to be performed based on the obtaining of the report. Computing device 600 can facilitate in whole or in part establishing a first connection with a first network via a first link, establishing a second connection with a second network via a second link subsequent to the establishing of the first connection, obtaining a first threshold value associated with a quality of the second link, measuring a value for a parameter associated with the second link, resulting in a measured value, comparing the measured value to the first threshold value, determining, based on the comparing, that the measured value is less than the first threshold value, and transmitting, based on the determining, a message that signifies that the measured value is less than the first threshold value. Computing device 600 can facilitate in whole or in part establishing a first connection with a communication device, wherein the first connection is associated with a first network, and wherein the communication device is connected to a second network via a second connection prior to the establishing of the first connection, determining that a quality of the first connection is less than a first threshold value, wherein the first threshold value is different from a second threshold value, and wherein the second threshold value corresponds to a loss of the first connection between a processing system and the communication device, causing, based on the determining, at least one action to be performed, and subsequent to the at least one action being performed, authorizing a release of the first connection.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x) = confidence(class)$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining a quality of service (QoS) requirement in respect of a communication service that is provisioned to a user equipment via a dual connectivity with the user equipment, wherein the dual connectivity includes a first connection to a first network operative in accordance with a first radio access technology (RAT) and a second connection to a second network operative in accordance with a second RAT that is different from the first RAT;
identifying an application that is executed by the user equipment as part of the communication service, resulting in an identified application;
selecting a first threshold value for the second connection based on the QoS requirement and the identified application;
providing, based on the selecting, the first threshold value to the user equipment;
obtaining a report from the user equipment, wherein the user equipment sends the report based on a measured value associated with the second connection being less than the first threshold value; and
causing an action to be performed based on the obtaining of the report.

2. The device of claim 1, wherein the first RAT includes an LTE network technology and the second RAT includes a 5G network technology.

3. The device of claim 1, wherein the report includes the first threshold value, the measured value, or a combination thereof.

4. The device of claim 3, wherein the operations further comprise:
identifying the action based on the first threshold value, the measured value, or the combination thereof, included in the report.

5. The device of claim 1, wherein the action includes throttling peer-to-peer traffic facilitated by the user equipment.

6. The device of claim 1, wherein the action includes reducing a quality of: an audio encoding, a video encoding, or a combination thereof.

7. The device of claim 1, wherein the action includes increasing a priority of the user equipment in the first network in terms of resources allocated to the user equipment in the first network.

8. The device of claim 1, wherein the operations further comprise:
authorizing a release of the second connection subsequent to the action being performed.

9. The device of claim 1, wherein the operations further comprise:
obtaining a plurality of measurements from the user equipment, wherein the plurality of measurements includes a first measurement indicating that a first signal is detected by the user equipment in the second network with a first signal strength, and wherein the plurality of measurements includes a second measurement indicating that a second signal is detected by the user equipment in a third network with a second signal strength.

10. The device of claim 9, wherein the operations further comprise:
selecting the second network for the dual connectivity based on the first signal strength being greater than the second signal strength.

11. The device of claim 10, wherein a first portion of the communication service is facilitated via the first network, and wherein the operations further comprise:
determining that a load facilitated via the first network exceeds a second threshold value; and
enabling, based on the determining, the dual connectivity to cause a second portion of the communication service to be facilitated via the second network.

12. The device of claim 1, wherein the operations further comprise:
providing first data associated with the communication service to a first communication device of the first network to cause the first communication device to transmit the first data to the user equipment via the first connection; and
providing second data associated with the communication service to a second communication device of the second network to cause the second communication device to transmit the second data to the user equipment via the second connection.

13. The device of claim 1, wherein the operations further comprise:
providing first data associated with the communication service to a first communication device of the first network to cause the first communication device to transmit the first data to the user equipment via the first connection; and
providing second data associated with the communication service to the first communication device to cause the first communication device to transmit the second data to a second communication device of the second network, wherein the second communication device transmits the second data to the user equipment via the second connection.

14. The device of claim 1, wherein the first network includes a first communication device and the second network includes a second communication device, and wherein the operations further comprise:

provide first data associated with the communication service to the second communication device to cause the second communication device to transmit the first data to the first communication device, wherein the first communication device transmits the first data to the user equipment via the first connection; and providing second data associated with the communication service to the second communication device to cause the second communication device to transmit the second data to the user equipment via the second connection.

15. A non-transitory machine-readable medium, comprising executable instructions that, when executed by a processing system including a processor, facilitate performance of operations, the operations comprising:

establishing a first connection with a first network via a first link;

establishing a second connection with a second network via a second link subsequent to the establishing of the first connection;

obtaining a first threshold value associated with a quality of the second link;

measuring a value for a parameter associated with the second link, resulting in a measured value;

comparing the measured value to the first threshold value;

determining, based on the comparing, that the measured value is less than the first threshold value; and transmitting, based on the determining, a message that signifies that the measured value is less than the first threshold value.

16. The non-transitory machine-readable medium of claim 15, wherein a loss-of-link condition associated with the second connection occurs at a second threshold value that is different from the first threshold value.

17. The non-transitory machine-readable medium of claim 15, wherein the parameter is based on: a received signal strength indicator (RSSI), a reference signal received power (RSRP), a reference signal received quality (RSRQ), or any combination thereof.

18. A method, comprising:

establishing, by a processing system including a processor, a first connection with a communication device, wherein the first connection is associated with a first network, and wherein the communication device is connected to a second network via a second connection prior to the establishing of the first connection;

determining, by the processing system, that a quality of the first connection is less than a first threshold value, wherein the first threshold value is different from a second threshold value, and wherein the second threshold value corresponds to a loss of the first connection between the processing system and the communication device;

causing, by the processing system and based on the determining, at least one action to be performed; and subsequent to the at least one action being performed, authorizing, by the processing system, a release of the first connection.

19. The method of claim 18, further comprising:

providing, by the processing system, the first threshold value to the communication device; and receiving, by the processing system, a first report from the communication device subsequent to the providing of the first threshold value to the communication device, wherein the determining that the quality of the first connection is less than the first threshold value is based on the receiving of the first report from the communication device.

20. The method of claim 19, further comprising:

subsequent to the authorizing of the release of the first connection, reestablishing, by the processing system, the first connection with the communication device, resulting in a reestablished first connection;

providing, by the processing system, a third threshold value to the communication device that causes the communication device to replace the first threshold value with the third threshold value at the communication device, wherein the third threshold value is different from each of the first threshold value and the second threshold value;

receiving, by the processing system, a second report from the communication device subsequent to the providing of the third threshold value to the communication device;

determining, by the processing system and based on the receiving of the second report, that a quality of the reestablished first connection is less than the third threshold value;

causing, by the processing system and based on the determining that the quality of the reestablished first connection is less than the third threshold value, a second at least one action to be performed; and subsequent to the second at least one action being performed, authorizing, by the processing system, a release of the reestablished first connection.

\* \* \* \* \*